United States Patent [19]

Jain et al.

[11] Patent Number: 5,742,674
[45] Date of Patent: Apr. 21, 1998

[54] AUTOMATIC CALL-BACK SYSTEM AND METHOD USING DATA INDICATING BEST TIME TO CALL

[75] Inventors: Ajay K. Jain, Holmdel; Paramdeep S. Sahni, Marlboro, both of N.J.

[73] Assignee: AT&T Corp., Middletown, N.J.

[21] Appl. No.: 577,892

[22] Filed: Dec. 22, 1995

[51] Int. Cl.[6] .............................. H04M 3/48; H04M 3/36
[52] U.S. Cl. ....................... 379/209; 379/113; 379/133; 379/201; 379/207; 379/229; 379/230
[58] Field of Search ........................... 379/67, 88, 89, 379/111, 112, 113, 114, 115, 128, 201, 209, 210, 211, 212, 265, 266, 202, 214, 133, 46

[56] References Cited

U.S. PATENT DOCUMENTS

| | | | |
|---|---|---|---|
| 4,166,929 | 9/1979 | Sheinbein | 379/207 |
| 4,930,152 | 5/1990 | Miller | 379/214 |
| 4,969,185 | 11/1990 | Dorst et al. | 379/209 |
| 5,023,868 | 6/1991 | Davidson et al. | 379/89 |
| 5,040,208 | 8/1991 | Jolissaint | 379/209 |
| 5,155,761 | 10/1992 | Hammond | 379/266 |
| 5,181,236 | 1/1993 | LaVallee et al. | 379/67 |
| 5,185,780 | 2/1993 | Leggett | 379/266 |
| 5,247,569 | 9/1993 | Cave | 379/266 |
| 5,260,986 | 11/1993 | Pershan | 379/209 |
| 5,268,957 | 12/1993 | Albrecht | 379/209 |
| 5,295,184 | 3/1994 | Smith et al. | 379/266 |
| 5,303,301 | 4/1994 | Takahata | 379/209 |
| 5,311,574 | 5/1994 | Livanos | 379/209 |
| 5,311,583 | 5/1994 | Friedes et al. | 379/209 |
| 5,425,091 | 6/1995 | Josephs | 379/201 |
| 5,436,965 | 7/1995 | Grossman et al. | 379/266 |
| 5,436,967 | 7/1995 | Hanson | 379/266 |
| 5,533,100 | 7/1996 | Bass et al. | 379/209 |
| 5,539,813 | 7/1996 | Jonsson | 379/209 |
| 5,546,449 | 8/1996 | Hogan et al. | 379/202 |
| 5,555,292 | 9/1996 | Eckhart | 379/209 |
| 5,559,878 | 9/1996 | Keys et al. | 379/266 |
| 5,577,111 | 11/1996 | Iida et al. | 379/209 |
| 5,579,382 | 11/1996 | Tsukishima | 379/209 |
| 5,590,183 | 12/1996 | Yoneda et al. | 379/209 |
| 5,621,790 | 4/1997 | Grossman et al. | 379/266 |
| 5,625,682 | 4/1997 | Gray et al. | 379/209 |
| 5,627,875 | 5/1997 | Kapsales | 379/209 |
| 5,627,884 | 5/1997 | Williams et al. | 379/266 |
| 5,640,445 | 6/1997 | David | 379/266 |
| 5,646,986 | 7/1997 | Sahni et al. | 379/207 |
| 5,646,988 | 7/1997 | Hikawa | 379/266 |
| 5,661,790 | 8/1997 | Hsu | 379/209 |

*Primary Examiner*—Krista Zele
*Assistant Examiner*—Scott Wolinsky
*Attorney, Agent, or Firm*—Thomas A. Restaino

[57] ABSTRACT

A system and method are disclosed for providing an automatic call-back when a calling party encounters a ring-no-answer condition upon calling a called party. An exemplary system includes: a first originating switch node (OSN) coupled to a first originating telephone call location corresponding to a calling party and, a terminating switch node (TSN) coupled to a destination telephone call location corresponding to a called party; a database coupled to the TSN for storing the called party's times of calling activity; a processor coupled to the TSN and to the database for processing the times of calling activity to determine a best time to call (BTTC) the called party (wherein the BTTC comprises a best exact time and/or a window of time) and providing the TSN with the BTTC; a signaling network for routing the BTTC to the OSN; and an adjunct coupled to the OSN for receiving the calling party's automatic call-back request and initiating an automatic call back to the calling party at the BTTC the called party. Upon receiving the automatic call-back request, the adjunct provides the calling party with the BTTC. The adjunct also requests the calling party to enter a time at which the calling party is most likely to be available to receive an automatic call-back and, if the time entered in response to said request is the best exact time or, within the window of time, the adjunct initiates an automatic call-back to said calling party at the time entered.

29 Claims, 1 Drawing Sheet

AUTOMATIC CALL-BACK SYSTEM AND METHOD USING DATA INDICATING BEST TIME TO CALL

TECHNICAL FIELD

This invention relates generally to communications switching systems and, more particularly, to a system and method for providing an automatic call-back.

BACKGROUND

Several telephone companies and some customer service equipment currently provide an automatic call-back service that allows a calling party to receive an automatic call-back when the calling party dials a called party number and receives a busy signal or a ring-no-answer signal. The various ways in which these services are provided are discussed below:

An automatic call-back for a busy condition is often accomplished by having the network redial the called party number at regular intervals for a predetermined period of time (otherwise known as "repeat dialing") until the network finds that the called party number is on-hook. Once an on-hook condition is sensed, the network dials the calling party number and announces that it is about to place a call to the called party number in satisfaction of the calling party's outstanding call back request. For example, the network may repeat dial the called party number every ten minutes for a period of up to one hour. However, often the attempts at sensing an on-hook condition are hit or miss; the called party number may be on-hook during the interval between call attempts and, busy at the time of each call attempt. Although increasing the incidence of the call attempts and the period over which such attempts are made may increase the likelihood of a successful call completion, a well known disadvantage to doing such is the impact that repeated unsuccessful call attempts have on the network—namely, increased congestion and reduced traffic-handling capacity.

An example of an automatic call-back service for ring-no-answer that also uses repeat dialing is "International Call Complete." The use of repeat dialing in the ring-no-answer context suffers from serious disadvantages in addition to those mentioned above. For example, unlike in the case of repeat dialing for busy, the network would not be attempting to merely sense an on-hook condition, but rather, would be dialing the called party number in the hope that the called party will answer the call; thus the network is not given the opportunity, as in the case of repeat dialing for busy, to dial the calling party number to confirm that the calling party is available and, still wishes to complete the call. Upon answering the call, the called party is asked whether he would be receptive to a call placed to the party who originally called him. Unfortunately, there is no guarantee that the calling party will still be available to take the call. Therefore, the repeat dialing process may have to continue (e.g., every ten minutes for up to one hour), even at the risk of offending the called party, who may have to repeatedly answer the telephone only to find that the calling party is still unavailable to complete the call. In addition, the widespread use of answering machines makes repeat dialing for a ring-no-answer condition, impractical.

A second call-back service for busy is currently being offered as one of the 5ESS Local Area Signaling Services (LASS) features. This service can provide an automatic call-back when a calling party encounters a busy signal and can be provided across a network of switches that use SS7 signaling between them for out-of-band call control. Once a calling party invokes this feature, the terminating switch "camps" on the called party's line until the called party goes on-hook. When an on-hook condition is sensed, the terminating switch signals the originating switch to place a call to the calling party. If the calling party answers the phone, a call is placed to the called party and the two calls are merged. However, neither the 5ESS LASS automatic call-back feature nor any other 5ESS LASS feature provides an automatic call-back when a calling party encounters a ring-no-answer condition.

SUMMARY OF INVENTION

The above-identified problems are solved and a technical advance is achieved in the art by providing an automatic call-back system and method for a ring-no-answer condition without having to resort to network executed repeat dialing of the called party number.

An exemplary system for providing an automatic call-back when a caller encounters a ring-no-answer condition, includes: a switching network having switches for routing telephone calls; the switching network comprising a first originating switch node coupled to a first originating telephone call location corresponding to a calling party number and, a terminating switch node coupled to a destination telephone call location corresponding to a called party number; a database coupled to the terminating switch node for storing calling activity of the called party number; a processor coupled to the terminating switch node for periodically processing the calling activity to determine a best time to call the called party number and providing the terminating switch node with the best time to call the called party number; a signaling network coupling switches in the switching network to one another for routing the best time to call the called party number to the originating switch node; and an adjunct coupled to the originating switch node for receiving an automatic call-back request of the calling party number and initiating the automatic call back to the calling party number at the best time to call the called party number.

Other and further aspects of the present invention will become apparent during the course of the following description and by reference to the attached drawings.

DETAILED DESCRIPTION

Figure 1:
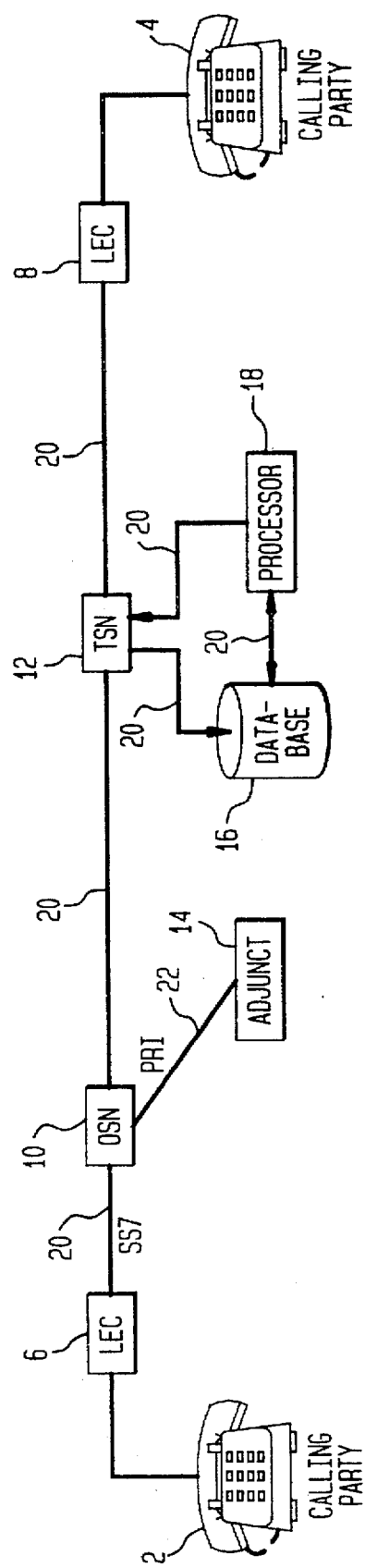
FIG. 1 is a block diagram illustrating one embodiment of the present invention.

Referring now to the drawings, FIG. 1 illustrates one embodiment of the present invention. As shown in FIG. 1, a calling party 2 and a called party 4 are coupled to an intermediary switching network via respective local exchange carrier (LEC) end offices (6, 8). The switching network comprises an originating switch node (OSN) 10 and a terminating switch node (TSN) 12. End-to-end SS7 connectivity 20 for transmitting out-of-band calling activity between the LECs (6, 8) and the switching network is assumed. Out-of-band calling activity includes call origination information such as the Calling Party Number ("Calling_PN") and/or Automatic Number Identification (ANI). It also includes call destination information such as the Called Party Number ("Called_PN"). As is also shown in FIG. 1, the OSN 10 is coupled to an adjunct 14 (an Interactive Voice Response Unit) and, the TSN 12 is coupled to both a database 16 and a processor 18.

An exemplary call flow used in conjunction with the embodiment of FIG. 1 will now be described, wherein a calling party 2 places a telephone call, gets a "ring-no-answer" signal, and invokes the automatic call-back feature of the present invention. The calling party 2 goes off-hook and gets dial-tone. The calling party 2 then dials the telephone number of the party with whom he wishes to communicate. The originating LEC 6 creates an Initial Address Message (IAM), which contains the Calling_PN, the Called_PN, and the ANI. The IAM is forwarded to the terminating LEC 8 via the switching network. The terminating LEC 8 rings the telephone associated with the Called_PN and, sends an Address Complete Message (ACM) via the switching network to the originating LEC 6. In the event that a ring-no-answer condition is encountered, the TSN 12, after a predetermined number of unanswered rings, transmits a "Best Time to Call" the called party 4 to the OSN 10.

The called party's 4 Best Time to Call is stored in the TSN 12, which is also the called party's 4 billing switch. Each time the called party 4 places an outgoing call, the TSN 12 transmits information regarding the call to the database 16. This information includes the called party's 4 number, the number dialed by the called party 4, and the start and end times associated with the call. In other words, the database 16 stores information regarding the called party's 4 times of calling activity. Moreover, the called party's 4 times of calling activity need not be limited to information regarding the called party's 4 outgoing calls; it can include information regarding the called party's 4 incoming calls as well.

On a periodic basis, for example, once a month, the processor 18 queries the database 16 for the called party's 4 times of calling activity and performs a pattern analysis well known to those of ordinary skill in the art to derive the Best Time to Call the called party 4. The Best Time to Call is then updated in the TSN 12. Data available from the called party's LEC 8 can be used together with the data available from the TSN 12 to derive the Best Time to Call. The Best Time to Call can include, for example, a best exact time (such as 7:00 PM) corresponding to the called party's 4 highest probability of availability for any instant in time. It can also include a "window" of time (for example, 6:00 PM to 8:00 PM) corresponding to a predetermined least acceptable probability of availability.

Also, the called party 4 can be provided with the option of overriding his Best Time to Call. For example, the called party 4 may wish to modify his Best Time to Call to reflect recent changes in his schedule; changes too recent to have been detected by the processor 18. In the interest of maintaining privacy, the called party 4 can also be provided with the option of altogether preventing the delivery of his Best Time to Call to calling parties.

Once the calling party 2 has placed a call to the called party 4 number and received a ring-no-answer signal, the calling party 2 can enter a feature code from the touchtone keypad of his telephone (for example, *68) to request an automatic call-back. The originating LEC 6 sends the *68 message to the OSN 10. At that point, the OSN 10 establishes a call connection to an adjunct 14. This can be accomplished by formulating a Q.931 SETUP message and transmitting it to the adjunct 14 through the D-channel of a primary rate interface (PRI) 22. This message includes both the IAM and the Best Time to Call, which the adjunct 14 stores for future reference as described below. Although the Best Time to Call was previously described as having been transmitted to the OSN 10 after a predetermined number of unanswered rings, the Best Time to Call can alternatively be transmitted to the OSN 10 after the calling party 2 has entered the automatic call-back feature code (*68).

The adjunct 14 then requests the OSN 10 to establish a voice path between the calling party 2 and the adjunct 14 through the B-channel of the PRI 22. When the calling party 2 answers the telephone, the OSN 10 receives an Answer Message (ANM) and, in response to the ANM, the adjunct 14 plays a pre-recorded announcement informing the calling party 2 of the Best Time to Call the called party 4. The Best Time to Call conveyed to the calling party 2 can include a best exact time and/or a window of time. For purposes of illustration, we first discuss the case where only a best exact time is disclosed to the calling party 2.

The adjunct 14 plays a pre-recorded announcement prompting the calling party 2 to enter a time at which the calling party 2 most likely would be available to receive an automatic call-back. At this point the calling party 2 can either hang up or respond to the prompt. The latter involves either defaulting to the called party's 4 best exact time or entering a time of his own. If the calling party 2 defaults to the called party's 4 best exact time or, enters a time (7:45 PM) that falls within the called party's 4 window of time (6:00 PM to 8:00 PM)(even though this window has not been disclosed to the calling party 2), the adjunct 14 informs the calling party 2 that an automatic call-back will be performed at the requested time. The calling party 2 then hangs up and, the usual release and release clear messages are exchanged between the LECs (6, 8) via the OSN 10 and the TSN 12.

If the calling party 2 enters a time (5:00 PM) that is outside the called party's 4 window of time, the adjunct 14 informs the calling party 2 that the automatic call-back will not be performed due to insufficient information regarding the called party's 4 availability during the requested call-back time. At that point, the calling party 2 can again be provided with the option of defaulting to the called party's 4 best exact time or entering a time of his own. After a predetermined number of unsuccessful attempts at entering a time that is within the called party's 4 window, the adjunct 14 will inform the calling party 2 that an automatic call-back will not be possible and, will terminate the call. However, if the calling party 2 defaults to the called party's 4 best exact time or, enters a time that is within the called party's 4 window of time, the adjunct 14 informs the calling party 2 that an automatic call-back will be performed at the requested time. The calling party 2 then hangs up and, the usual release and release clear messages are exchanged between the LECs (6, 8) via the OSN 10 and the TSN 12.

As indicated above, rather than disclosing only a best exact time, the adjunct 14 may instead disclose a window of time or, both a window of time and a best exact time to the calling party 2. The primary difference between these alternatives, and the case where only a best exact time is disclosed, is that the calling party 2 is provided with the called party's 4 window of availability and thus, can respond more intelligently to the adjunct's 14 prompt for a time at which the calling party 2 is most likely to be available to receive an automatic call-back. Furthermore, the adjunct 14, while prompting the calling party 2 for this information, can further educate the calling party 2 by announcing that only times within the called party's 4 window of time will be accepted.

At the calling party's 2 requested time, the adjunct 14 signals the OSN 10 to establish a connection (data and voice over the D-channel and the B-channel of the PRI, respectively) between the adjunct 14 and the calling party 2 for purposes of satisfying the calling party's 2 outstanding automatic call-back request. This is accomplished by the adjunct 14 transmitting the Calling_PN portion of the previously stored IAM to the OSN 10. The OSN 10 generates an IAM, transmits the IAM to the LEC 6 and receives an ACM in return. When the calling party 2 answers the telephone, the OSN 10 receives an ANM and, in response to the ANM, the adjunct 14 plays a pre-recorded announcement indicating that the network is placing a ring-no-answer automatic call-back telephone call to the Called_PN. If the calling party 2 wishes to complete the call, he will be instructed to enter "1" from the touch-tone keypad of his telephone. If the calling party 2 decides not to complete the call, he will be instructed to enter "2" from same. In the event that the calling party 2 enters "1", the adjunct 14 transmits the Called_PN portion of the previously stored IAM to the OSN 10. The OSN 10 generates an IAM and places a call to the Called_PN via the TSN 12 and the appropriate LEC 8. Once again, the OSN 10 receives the usual ACM. When the called party 4 answers the telephone, the OSN 10 receives the usual ANM. At that instant, the adjunct 14 merges the two calls (one to the Calling_PN and the other to the Called_PN) at the OSN 10, and the call completes as a normal Plain Old Telephone Service (POTS) call.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, while this disclosure has focused upon providing an automatic call-back for a calling party who encounters a ring-no-answer condition in an inter-LATA switching network, the foregoing disclosure is sufficient to enable one of ordinary skill in the art to readily apply the present invention to providing an automatic call-back for ring-no-answer on an intra-LATA basis. Thus, although the preferred embodiment illustrates the present invention as being implemented using a plurality of switches, it would be appreciated by one of ordinary skill in the art that the same can be implemented in a single switch environment.

We claim:

1. A system for providing an automatic call-back to a caller at a calling party number that encounters a ring-no-answer condition upon calling a called party number, comprising:

a switching network having switches for routing telephone calls;

said switching network comprising a first originating switch node coupled to a first originating telephone call location corresponding to said calling party number and, a terminating switch node coupled to a destination telephone call location corresponding to said called party number;

a database coupled to said terminating switch node for storing information regarding times of calling activity of said called party number;

a processor coupled to said terminating switch node and to said database for analyzing said information to determine a best time to call said called party number and providing said terminating switch node with data indicating said best time to call said called party number;

a signaling network coupling switches in said switching network to one another for transmitting said data indicating said best time to call said called party number to said originating switch node; and an adjunct coupled to said originating switch node for receiving an automatic call-back request from said caller at said calling party number and initiating said automatic call-back to said calling party number at said best time to call said called party number.

2. The system of claim 1 wherein said best time to call said called party number comprises a best exact time and a window of time.

3. The system of claim 2 wherein said best exact time corresponds to a highest probability of availability of said called party number for any instant in time and said window of time corresponds to a predetermined least acceptable probability of availability of said called party number.

4. The system of claim 2 wherein said adjunct conveys said best exact time to said caller.

5. The system of claim 4 wherein said adjunct requests said caller to enter a time at which said calling party number is most likely available to receive an automatic call-back and, if said time entered in response to said adjunct request is said best exact time, said adjunct initiates said automatic call-back to said calling party number at said best exact time.

6. The system of claim 4 wherein said adjunct requests said caller to enter a time at which said calling party number is most likely available to receive an automatic call-back and, if said time entered in response to said adjunct request is within said window of time, said adjunct initiates said automatic call-back to said calling party number at said time entered.

7. The system of claim 2 wherein said adjunct conveys said window of time to said caller.

8. The system of claim 7 wherein said adjunct requests said caller to enter a time at which said calling party number is most likely available to receive an automatic call-back and, if said time entered in response to said adjunct request is said best exact time, said adjunct initiates said automatic call-back to said calling party number at said best exact time.

9. The system of claim 7 wherein said adjunct requests said caller to enter a time at which said calling party number is most likely available to receive an automatic call-back and, if said time entered in response to said adjunct request is within said window of time, said adjunct initiates said automatic call-back to said calling party number at said time entered.

10. The system of claim 1, whereupon completing said automatic call-back to said calling party number, said adjunct transmits a pre-recorded announcement to said caller via said switching network indicating that an attempt will be made to complete a telephone call to said called party number in satisfaction of said automatic call-back request from said caller at said calling party number.

11. The system of claim 10, whereupon completing said telephone call to said called party number, said adjunct merges said telephone call to said calling party number with said telephone call to said called party number.

12. A method for providing an automatic call-back to a caller at a calling party number that encounters a ring-no-answer condition upon calling a called party number, comprising the steps of:

storing times of calling activity of said called party number over a period of time prior to said calling party number encountering said ring-no-answer condition;

determining a best time to call said called party number based upon said stored times of calling activity; and initiating said automatic call-back to said calling party number at said best time to call said called party number.

13. The method of claim 12 wherein said best time to call said called party number comprises a best exact time and a window of time and, further comprising the step of:

providing said caller with said best exact time, prior to said step of initiating said automatic call-back.

14. The method of claim 13 further comprising the steps of:

requesting said caller to enter a time at which said calling party number is most likely available to receive an automatic callback;

comparing said time entered in response to said request with said best exact time; and initiating said automatic call-back to said calling party number at said best exact time if said entered is said best exact time.

15. The method of claim 13 further comprising the steps of:

requesting said caller to enter a time at which said calling party number is most likely available to receive an automatic call-back;

comparing said time entered in response to said request with said window of time; and initiating said automatic call-back to said calling party number at said time entered if said time entered is within said window of time.

16. The method of claim 12 wherein said best time to call said called party number comprises a best exact time and a window of time and, further comprising the step of:

providing said caller with said window of time, prior to said step of initiating said automatic call-back.

17. The method of claim 16 further comprising the steps of:

requesting said caller to enter a time at which said calling party number is most likely available to receive an automatic call-back;

comparing said time entered in response to said request with said best exact time; and initiating said automatic call-back to said calling party number at said best exact time if said time entered is said best exact time.

18. The method of claim 16 further comprising the steps of:

requesting said caller to enter a time at which said calling party number is most likely available to receive an automatic call-back;

comparing said time entered in response to said request with said window of time; and initiating said automatic call-back to said calling party number at said time entered if said time entered is within said window of time.

19. The method of claim 12, wherein said best time to call comprises a best exact time.

20. The method of claim 12, wherein said best time to call comprises a window of time.

21. The method of claim 12 wherein said times of calling activity of said called party number include start and end times of calls originating from said called party number.

22. The method of claim 12 wherein said times of calling activity of said called party number include start and end times of calls to said called party number.

23. The method of claim 12 wherein said times of calling activity of said called party number include start and end times of calls involving said called party number.

24. The method of claim 12 further comprising the steps of:

initiating a telephone call to said called party number; and merging said telephone call to said calling party number with said telephone call to said called party number.

25. A method tot providing an automatic call-back to a caller at a calling party number that encounters a ring-no-answer condition upon calling a called party number, comprising the steps of:

determining a best time to call said called party number based upon times of calling activity of said called party number;

conveying said best time to call said called party number to said calling party number;

requesting said caller to enter a time at which said calling party number is most likely available to receive an automatic call-back; and initiating said automatic call-back to said calling party number at said time entered, if said time entered is within a window of time corresponding to a predetermined least acceptable probability of availability of said called party number.

26. The method of claim 25, wherein said best time to call comprises a window of time corresponding to said predetermined least acceptable probability of availability of said called party number.

27. The method of claim 25, wherein said best time to call comprises a best exact time.

28. The method of claim 27, wherein said initiating step includes the step of:

initiating said automatic call-back to said calling party number at said time enterd, if said time entered is said best exact time.

29. The method of claim 25 wherein said times of calling activity of said called party number include start and end times of calls originating from said called party number.

* * * * *